(12) United States Patent
Yamauchi

(10) Patent No.: US 10,951,780 B2
(45) Date of Patent: Mar. 16, 2021

(54) IMAGE PROCESSING APPARATUS FOR EASILY SETTING DIRECTION OF DOCUMENT AND SCREEN DISPLAY METHOD BY IMAGE PROCESSING APPARATUS

(71) Applicant: Shin Yamauchi, Tokyo (JP)

(72) Inventor: Shin Yamauchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/590,511

(22) Filed: Oct. 2, 2019

(65) Prior Publication Data
US 2020/0204692 A1    Jun. 25, 2020

(30) Foreign Application Priority Data
Dec. 21, 2018 (JP) .............................. JP2018-239750

(51) Int. Cl.
*H04N 1/00* (2006.01)
*H04N 1/203* (2006.01)
*H04N 1/10* (2006.01)

(52) U.S. Cl.
CPC ..... *H04N 1/00395* (2013.01); *H04N 1/00411* (2013.01); *H04N 1/00466* (2013.01); *H04N 1/00588* (2013.01); *H04N 1/00663* (2013.01); *H04N 1/00689* (2013.01); *H04N 1/00721* (2013.01); *H04N 1/00771* (2013.01); *H04N 1/00734* (2013.01); *H04N 1/10* (2013.01); *H04N 1/203* (2013.01); *H04N 2201/0081* (2013.01)

(58) Field of Classification Search
CPC .......... H04N 1/00395; H04N 1/00411; H04N 1/00466; H04N 1/00588; H04N 1/00663; H04N 1/00689; H04N 1/00721; H04N 1/00771; H04N 1/00734
See application file for complete search history.

(56) References Cited

U.S. PATENT DOCUMENTS

| 5,530,560 A * | 6/1996 | Nakajima | H04N 1/3247 358/450 |
| 5,625,466 A * | 4/1997 | Nakajima | H04N 1/3873 358/296 |
| 6,285,842 B1 * | 9/2001 | Katamoto | H04N 1/00352 399/14 |
| 6,697,091 B1 * | 2/2004 | Rzepkowski | H04N 1/3877 345/689 |

(Continued)

FOREIGN PATENT DOCUMENTS

| JP | 2003-324599 | 11/2003 |
| JP | 2017-038237 | 2/2017 |

*Primary Examiner* — Scott A Rogers
(74) *Attorney, Agent, or Firm* — IPUSA, PLLC

(57) ABSTRACT

An image processing apparatus includes: an automatic document feeder; a document placement table; a document detector provided on at least one of the automatic document feeder and the document placement table, the document detector being configured to detect a document; and circuitry to cause a display to display one of a first screen that receives an input for selecting an orientation of a document placed on the automatic document feeder and a second screen that receives an input for selecting the orientation of the document placed on the document placement table, based on a detection result of the document detector.

5 Claims, 11 Drawing Sheets

(56) References Cited

U.S. PATENT DOCUMENTS

| | | | |
|---|---|---|---|
| 6,850,259 B1* | 2/2005 | Rzepkowski | G06F 3/04847 |
| | | | 345/689 |
| 6,859,287 B1* | 2/2005 | Frederiksen | G03G 15/605 |
| | | | 358/1.12 |
| 7,194,217 B2* | 3/2007 | Hosoi | G03G 15/607 |
| | | | 399/371 |
| 8,824,002 B1* | 9/2014 | Nitta | G06T 11/60 |
| | | | 358/1.2 |
| 2003/0202191 A1 | 10/2003 | Osawa et al. | |
| 2008/0016518 A1* | 1/2008 | Yokoyama | H04N 1/00811 |
| | | | 719/321 |
| 2009/0161175 A1* | 6/2009 | Fujishita | H04N 1/00002 |
| | | | 358/474 |
| 2017/0048399 A1* | 2/2017 | Umezawa | H04N 1/0044 |

* cited by examiner

FIG. 4

| TYPES OF PROCESSES | DISPLAY TARGET INFORMATION |
|---|---|
| FULL-COLOR COPY PROCESS | No |
| AUTO REDUCE/ENLARGE PRINTING PROCESS | No |
| DUPLEX PRINTING PROCESS | Yes |
| SORT PROCESS | No |
| COMBINE PRINTING PROCESS | Yes |
| SERIES PRINTING PROCESS | Yes |
| STAPLE PROCESS | Yes |
| PUNCH PROCESS | Yes |
| | |

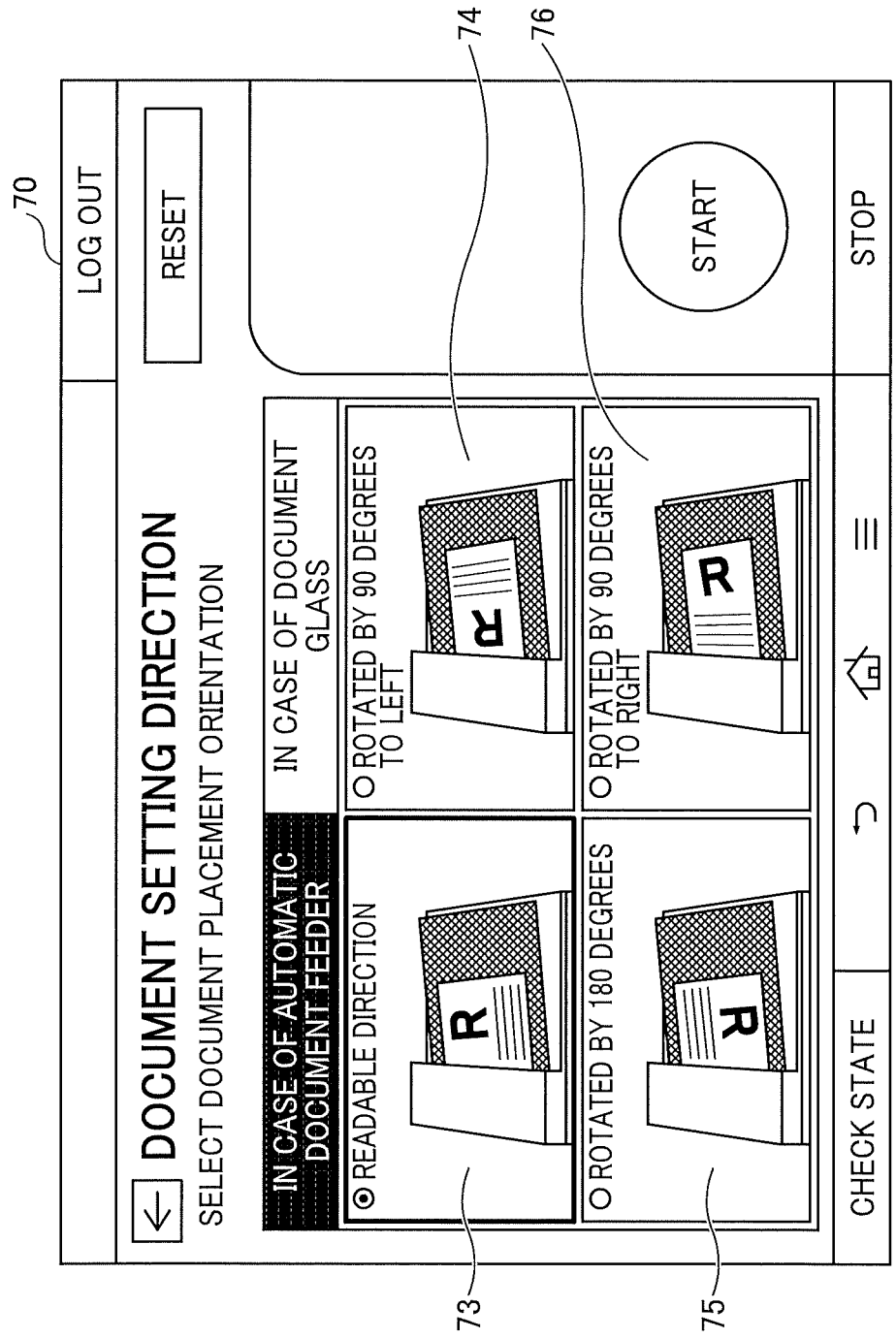

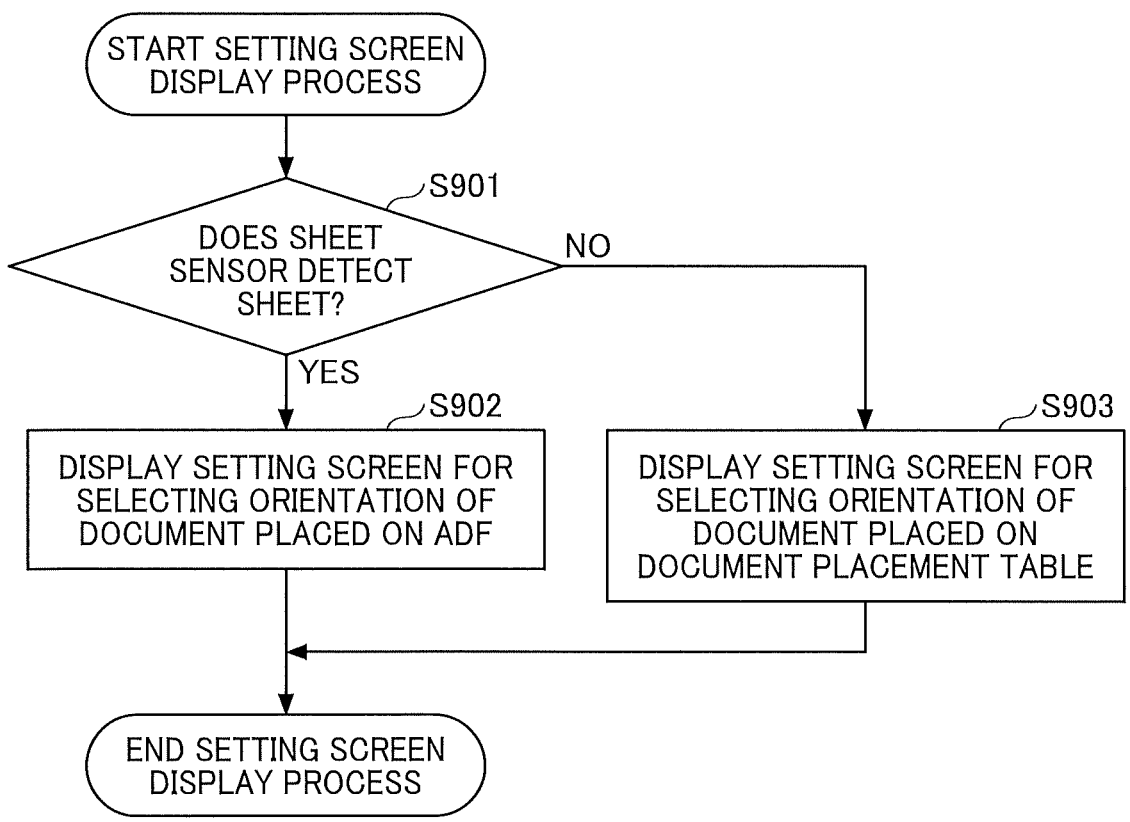

IMAGE PROCESSING APPARATUS FOR EASILY SETTING DIRECTION OF DOCUMENT AND SCREEN DISPLAY METHOD BY IMAGE PROCESSING APPARATUS

CROSS-REFERENCE TO RELATED APPLICATION

This patent application is based on and claims priority pursuant to 35 U.S.C. § 119(a) to Japanese Patent Application No. 2018-239750, filed on Dec. 21, 2018, in the Japan Patent Office, the entire disclosure of which is incorporated herein by reference.

BACKGROUND

Technical Field

The present disclosure relates to an image processing apparatus and a screen display method by the image processing apparatus.

Description of the Related Art

In a conventional image processing apparatus or the like, a user sets an orientation of a document on an auto document feeder (ADF), exposure glass or the like and places the document in the set orientation. Thus, the image processing apparatus performs processes on a printing surface intended by the user.

In the conventional image processing apparatus, examples of the processes that require document orientation setting include a duplex printing process, a combine printing process, a staple process, and the like.

One may select the document orientation from a list of images, which makes it easy to configure settings of the document orientation.

The conventional image processing apparatus displays images each representing a document set on the ADF and images each representing a document set on the exposure glass. However, in order to configure settings of the document orientations by the list of images for both the images representing documents set on the ADF and the images representing documents set on the exposure glass, images are required for each of the ADF and the exposure glass. Therefore, many images have to be displayed on a display screen. In addition, many images displayed on the display screen makes it difficult for a user to select a desired image.

SUMMARY

According to an embodiment, an image processing apparatus includes: an automatic document feeder; a document placement table; a document detector provided on at least one of the automatic document feeder and the document placement table, the document detector being configured to detect a document; and circuitry to cause a display to display one of a first screen that receives an input for selecting an orientation of a document placed on the automatic document feeder and a second screen that receives an input for selecting the orientation of the document placed on the document placement table, based on a detection result of the document detector.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a diagram for explaining a list stored in a target process storage unit, according to an embodiment of the present disclosure;

FIGS. 7A and 7B are views illustrating examples of a setting screen, according to an embodiment of the present disclosure;

FIG. 9 is a flowchart illustrating an operation performed by the operation device, according to an embodiment of the present disclosure.

Figure 1:
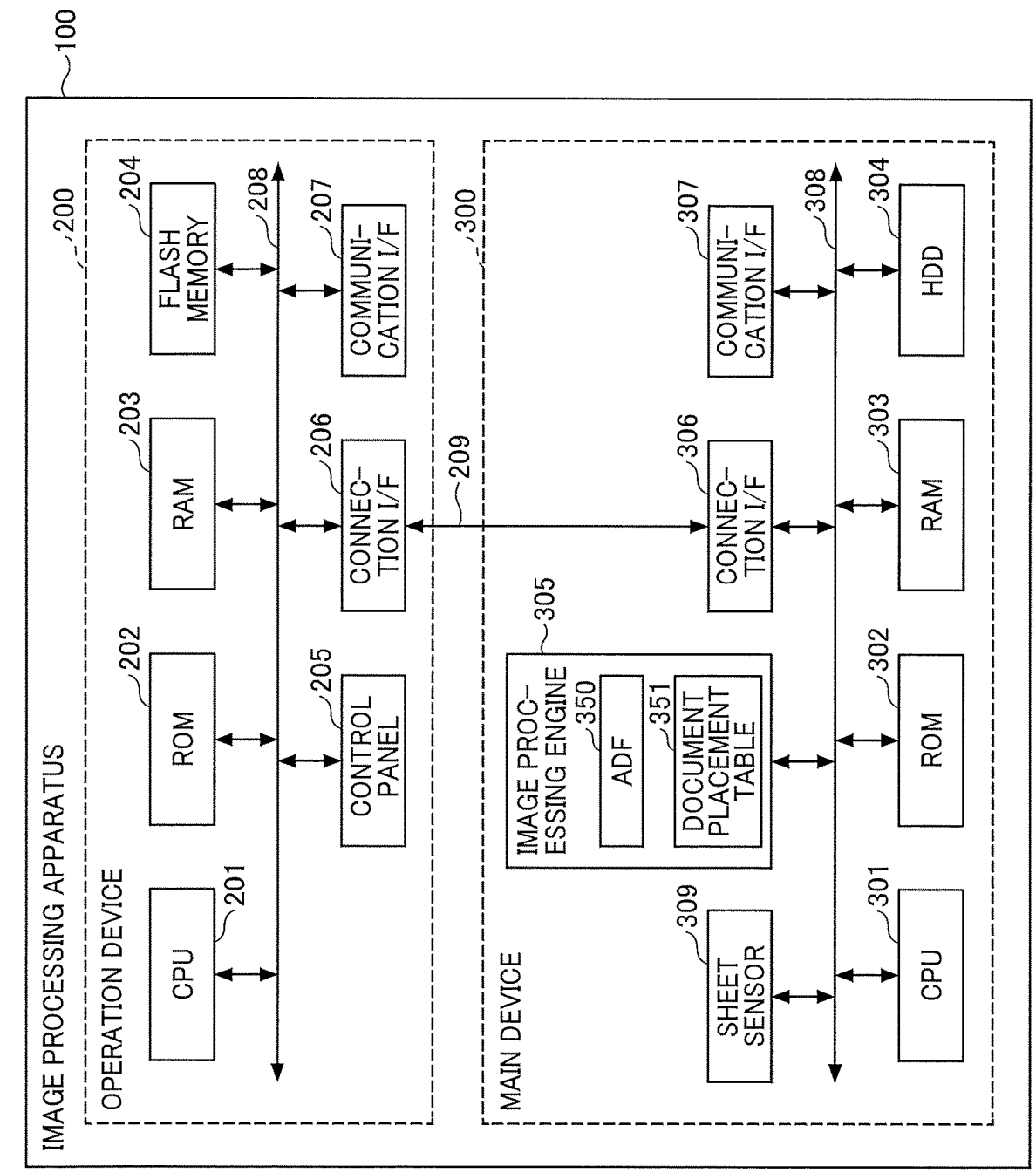
FIG. 1 is a diagram illustrating an example of hardware configuration of an image processing apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

The present embodiment will be described below with reference to the drawings. In the present embodiment, when an execution instruction for a process requiring setting of the orientation of the document to be placed is given, a setting screen for setting the orientation of the document is displayed.

FIG. 1 is a diagram illustrating an example of hardware configuration of an image processing apparatus.

An image processing apparatus 100 according to the present embodiment is a multifunction printer (MFP) such as a multifunction peripheral, and has image processing functions such as a copy function, a scan function, a facsimile (FAX) function, and a print function. Note that the image processing apparatus 100 according to the present embodiment is not limited to the MFP, and may be a copier, a FAX machine, or the like.

As illustrated in FIG. 1, the image processing apparatus 100 includes an operation device 200 and a main device 300.

The operation device 200 is used when a user performs various operations such as selection of an image processing function to be executed by the main device 300, input of various setting values for executing the image processing function, input of an instruction to start execution of the image processing function, and switching of a display screen.

The main device 300 executes various processes such as execution of the image processing function according to various operations of the user on the operation device 200. In addition, the main device 300 makes a request for the operation device 200 to display various messages.

The operation device 200 according to the present embodiment includes a central processing unit (CPU) 201, a read only memory (ROM) 202, and a random access memory (RAM) 203. The operation device 200 further includes a flash memory 204, a control panel 205, a connection interface (I/F) 206, and a communication I/F 207. These pieces of hardware are connected to one another through a bus 208.

The CPU 201 is an arithmetic operation device that uses the RAM 203 as a work area and executes various programs stored in the ROM 202 or the flash memory 204 to control entirety of the operation device 200.

The ROM 202 is a non-volatile semiconductor memory (storage device) capable of retaining data even if power is turned off. The RAM 203 is a volatile semiconductor memory (storage device) that temporarily stores programs and data.

The flash memory 204 is a non-volatile storage medium, and stores various programs (for example, programs for realizing the present embodiment) and various data executed by the CPU 201.

The control panel 205 is a touch panel or the like, and is used when a user performs various operations. In addition, the control panel 205 displays various messages. That is, the control panel 205 displays, for example, a graphical user interface (GUI) display screen for a user to perform various operations for various functions of the image processing apparatus 100 and information (error message, guidance message, and the like) such as processing results and the like of the image processing apparatus 100.

Note that the control panel 205 of the present embodiment is an example of a display.

The connection I/F 206 is an interface for communicating with the main device 300 through a communication path 209. For example, a universal serial bus (USB)-compliant interface is used for the connection I/F 206.

The communication I/F 207 is an interface for communicating with another device or the like. For example, a Wi-Fi-compliant wireless local area network (LAN) is used as the communication I/F 207.

The main device 300 of the present embodiment includes a CPU 301, a ROM 302, and a RAM 303. The main device 300 further includes a hard disk drive (HDD) 304, an image processing engine 305, a connection I/F 306, a communication I/F 307, and a sheet sensor 309. These pieces of hardware are connected to one another through a bus 308.

The CPU 301 is an arithmetic operation device that uses the RAM 303 as a work area and executes various programs stored in the ROM 302 or the HDD 304 to control entirety of the main device 300.

The ROM 302 is a non-volatile semiconductor memory (storage device) capable of retaining data even if power is turned off. The RAM 303 is a volatile semiconductor memory (storage device) that temporarily stores programs and data.

The HDD 304 is a non-volatile storage medium, and stores various programs (for example, programs for realizing the present embodiment) and various data executed by the CPU 301.

The image processing engine 305 is hardware that performs image processes such as a copy function, a scan function, a FAX function, a print function, and the like.

The image processing engine 305 includes, for example, a scanner that optically reads a document and generates image data, a plotter that performs printing on a sheet material such as a paper sheet, and a FAX communication device that performs FAX communication. For example, the image processing engine 305 may further include a finisher or the like that sorts printed sheet materials.

The image processing engine 305 of the image processing apparatus 100 according to the present embodiment includes an automatic document feeder (ADF) 350 that automatically feeds a document. The scanner reads a document placed on the ADF 350 to generate image data. The image processing engine 305 further includes a document placement table 351. The document placement table 351 includes an exposure glass. A scanner reads a document placed on the document placement table 351 to generate image data.

In a case where a document is placed on the ADF 350 and a case where the document is placed on the document placement table 351, sides of the document read by the scanner are opposite with respect to the direction of gravity. That is, in a case where a document is placed on the ADF 350, the document is placed such that the side of the document which is read (the side on which characters are printed) faces the ceiling. In a case where a document is placed on the document placement table 351, the document is placed such that the side of the document which is read (side on which the characters are printed) faces the ground.

The connection I/F 306 is an interface for communicating with the operation device 200 through the communication path 209. For example, a USB-compliant interface is used for the connection I/F 306.

The communication I/F 307 is an interface for communicating with another device or the like. For example, a Wi-Fi-compliant wireless LAN is used as the communication I/F 307.

The sheet sensor 309 is a sensor that detects a document. The sheet sensor 309 is provided in the ADF 350. The sheet sensor 309 detects a document in a case where paper is placed on the ADF 350. The sheet sensor 309 includes a light emitter and a light receiver. The light emitter and the light receiver are arranged in the ADF 350 so that light is blocked in a case where a document is placed.

In a case where the light receiver does not detect light from the light emitter, the sheet sensor 309 outputs a detection signal indicating that the document has been detected to the image processing engine 305. In contrast, in a case where the light receiver detects light from the light emitter, the detection signal is not output to the image processing engine 305.

Note that the sheet sensor 309 of the present embodiment is an example of a document detector.

The image processing apparatus 100 according to the present embodiment implements various processes described below with the above-described hardware configuration.

Note that, for example, in FIG. 1, the image processing apparatus 100 includes the operation device 200. However, the present disclosure is not limited to this. The operation device 200 may be an information processing terminal such as a tablet terminal, a smartphone, a mobile phone, or a personal digital assistant (PDA). That is, these information processing terminals may be able to communicate with the image processing apparatus 100 through the communication I/F 207 of the operation device 200 or the communication I/F 307 of the main device 300 to control the image processing apparatus 100.

Figure 2:
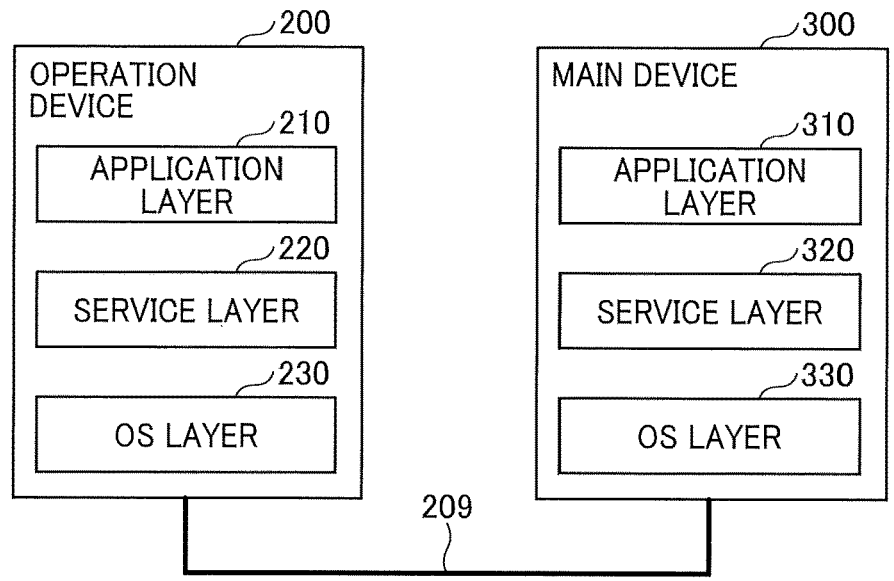
FIG. 2 is a diagram illustrating an example of hierarchical structures of program groups included in an operation device and a main device of the image processing apparatus, according to an embodiment of the present disclosure.

Next, referring to FIG. 2, hierarchical structures of program groups included in the operation device 200 and the main device 300 of the image processing apparatus 100 will be described. FIG. 2 is a diagram illustrating an example of hierarchical structures of program groups included in the operation device and the main device of the image processing apparatus.

FIG. 2 illustrates the hierarchical structure of the program group included in the operation device 200 and the hierarchical structure of the program group included in the main device 300.

The program group included in the operation device 200 is stored in the ROM 202, the flash memory 204, and the like. The program group included in the main device 300 is stored in the ROM 302, the HDD 304, and the like.

First, the hierarchical structure of the program group included in main device 300 will be described. The program group included in the main device 300 can be roughly divided into an application layer 310, a service layer 320, and an operating system (OS) layer 330.

The programs classified into the application layer 310 are programs for operating hardware resources to implement image processing functions. Specifically, the programs include a copy application, a scan application, a FAX application, a print application and the like.

The program classified into the service layer 320 is a program interposed between the application layer 310 and the OS layer 330. The program serves as an interface for the programs of the application layer 310 to use hardware resources provided in the main device 300 and for notifying the status of the hardware resources provided in the main device 300.

Specifically, the program receives operation requests for the hardware resources, and arbitrates received operation requests. The program also transmits an error detected in the hardware resources as error information. Note that the operation request that the service layer 320 requests includes, for example, an operation request for an image process made by the image processing engine 305 (a reading operation request made by the scanner, a printing operation request made by the plotter, and the like).

Note that the role as the interface that the program classified into the service layer 320 plays is similar for the application layer 210 of the operation device 200. That is, also the program classified into the application layer 210 of the operation device 200 can access the service layer 320 to operate the hardware resources of the main device 300 and to implement the image processing function.

The program classified into the OS layer 330 is a program called basic software, and provides basic functions to control the hardware resources of the main device 300. The program classified into the OS layer 330 receives an operation request for the hardware resources from the program classified into the application layer 310 via the program classified into the service layer 320, and performs the process corresponding to the operation request. In addition, when the program classified into the OS layer 330 is executed, the program receives an error detected in the hardware resources, and passes the error to the service layer 320 as error information.

Next, the hierarchical structure of the program group included in the operation device 200 will be described. Similarly to the main device 300, the program group included in the operation device 200 can also be roughly divided into an application layer 210, a service layer 220, and an OS layer 230.

However, the functions provided by the program classified into the application layer 210 and the types of operation requests that the service layer 220 can receive differ from the functions and the types of the operation requests in the main device 300. The program classified into the application layer 210 of the operation device 200 mainly provides a user interface function for performing various types of operation and display.

Note that in the present embodiment, the OS of the operation device 200 operates independently from the OS of the main device 300. In addition, as long as the operation device 200 and the main device 300 can communicate with each other, the OSs do not have to be an identical type. For example, the operation device 200 can use Android (registered trademark) as the OS, and the main device 300 can use Linux (registered trademark) as the OS.

As described above, in the image processing apparatus 100, the operation device 200 and the main device 300 are controlled by different OSs. Therefore, communication between the operation device 200 and the main device 300 is performed not as inter-process communication within one device, but as communication between different information processing devices. For example, operation in which the operation device 200 transmits operation information indicating received various operations of the user to the main device 300 and operation in which the main device 300 transmits a display request giving an instruction on display of the display screen to the operation device 200 fall under the communication between different information processing devices.

However, the image processing apparatus 100 according to the present embodiment is not limited to the case where different types of OSs operate in the operation device 200 and the main device 300. OSs of an identical type may operate in the operation device 200 and the main device 300. In addition, the image processing apparatus 100 according to the present embodiment is not limited to the case where different types of OSs operate in the operation device 200 and the main device 300. One OS may operate in the operation device 200 and the main device 300.

Note that although the image processing apparatus 100 includes the operation device 200 and the main device 300 in FIGS. 1 and 2, the present disclosure is not limited to this. For example, in the image processing apparatus 100 according to the present embodiment, for example, the main device 300 may include the operation device 200. In this case, the main device 300 is provided with the control panel 205.

Figure 3:
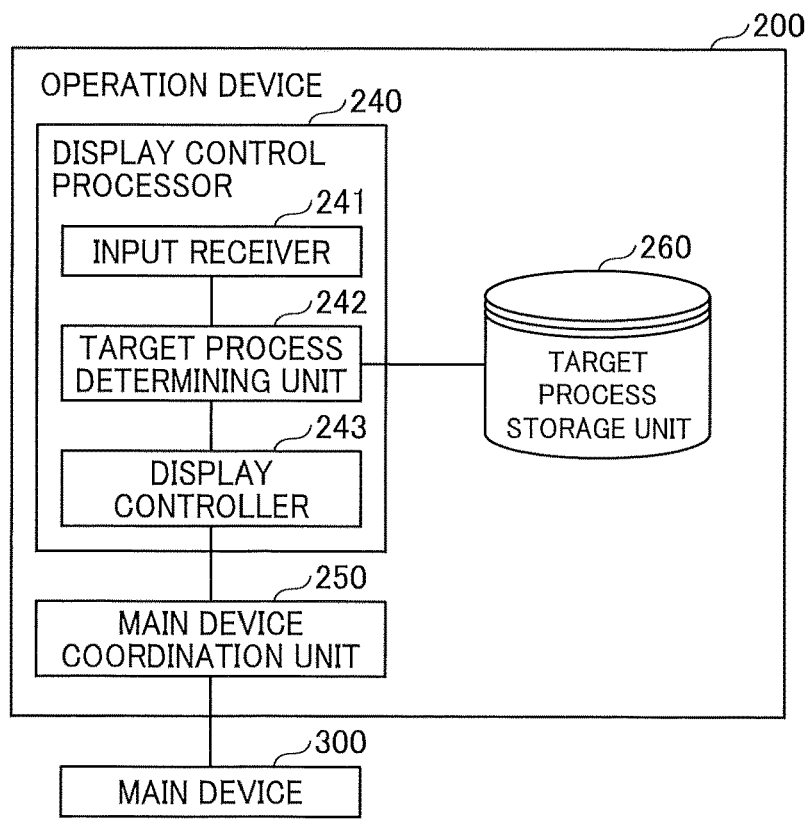
FIG. 3 is a diagram for explaining functions of the operation device, according to an embodiment of the present disclosure.

Next, the functions of the operation device 200 of the present embodiment will be described with reference to FIG. 3. FIG. 3 is a diagram for explaining the functions of the operation device. Note that each function of the operation device 200 is implemented by the CPU 201 executing the program classified into the application layer 210.

The operation device 200 according to the present embodiment includes a display control processor 240, a main device coordination unit 250, and a target process storage unit 260.

The display control processor 240 of the present embodiment causes the control panel 205 to display a setting screen for setting the orientation of the set document according to the operation that the operation device 200 receives. Details of the display control processor 240 will be described later.

The main device coordination unit 250 according to the present embodiment transmits to the main device 300 a request for executing the image processing function, and receives from the main device 300 a message display request for displaying various messages such as an error message and a guidance message on the control panel 205.

The target process storage unit 260 stores a list in which the type of process executed by the image processing apparatus 100 and information indicating whether or not the process is a target process for displaying the setting screen are associated with each other. In the present embodiment, processes which are targets for displaying the setting screen are determined in advance.

The processes which are targets for displaying the setting screen according to the present embodiment are processes requiring setting of the orientation of the document when the processes are performed. In other words, the processes which are targets for displaying the setting screen are processes executed using information indicating the orientation of the document set in the operation device 200.

The list stored in the target process storage unit 260 will be described below with reference to FIG. 4. FIG. 4 is a diagram for explaining the list stored in a target process storage unit.

In a list 261 stored in the target process storage unit 260 according to the present embodiment, the type of process is associated with information (hereinafter, display target information) indicating whether or not the process is a target process for displaying the setting screen. That is, in the list 261, information indicating whether or not the process is of the type using information indicating the orientation of the document is associated with each of the plurality of processes.

For example, the types of processes may include all types of processes executed in the image processing apparatus 100, or may include only the type of a copy process.

In FIG. 4, the display target information corresponding to the type of process "full-color copy process" is "No". Therefore, it can be understood that the type of process "full-color copy process" is not the target for displaying the setting screen.

Similarly, the display target information corresponding to the type of process "duplex printing process" is "Yes". Therefore, it can be understood that the type of process "duplex printing process" is a target for displaying the setting screen.

Note that in the example of FIG. 4, "Yes" is illustrated as an example indicating that the process is the target for displaying in the display target information, and "No" is illustrated as an example indicating that the process is not the target for displaying in the display target information. However, the present disclosure is not limited to this. It is sufficient that the display target information enables whether or not the type of corresponding process is a process which is a target for displaying the setting screen can be determined.

Note that examples of the processes which are targets for displaying the setting screen include, in addition to a "duplex printing process", a "combine printing process", a "series printing process", a "staple process", and a "punch process" illustrated in FIG. 4, a bookbinding process, a double-page spread duplex printing process, an enlarged continuous printing process, and the like.

The display control processor 240 will be further described below. The display control processor 240 of the present embodiment includes an input receiver 241, a target process determining unit 242, and a display controller 243.

The input receiver 241 of the present embodiment receives input to the control panel 205. The target process determining unit 242 refers to the target process storage unit 260 and determines whether or not the process corresponding to the operation that the input receiver 241 receives is a process which is a target for displaying the setting screen.

The display controller 243 causes the setting screen to be displayed before executing the instruction corresponding to the operation, according to the determination result obtained by the target process determining unit 242.

Figure 5:
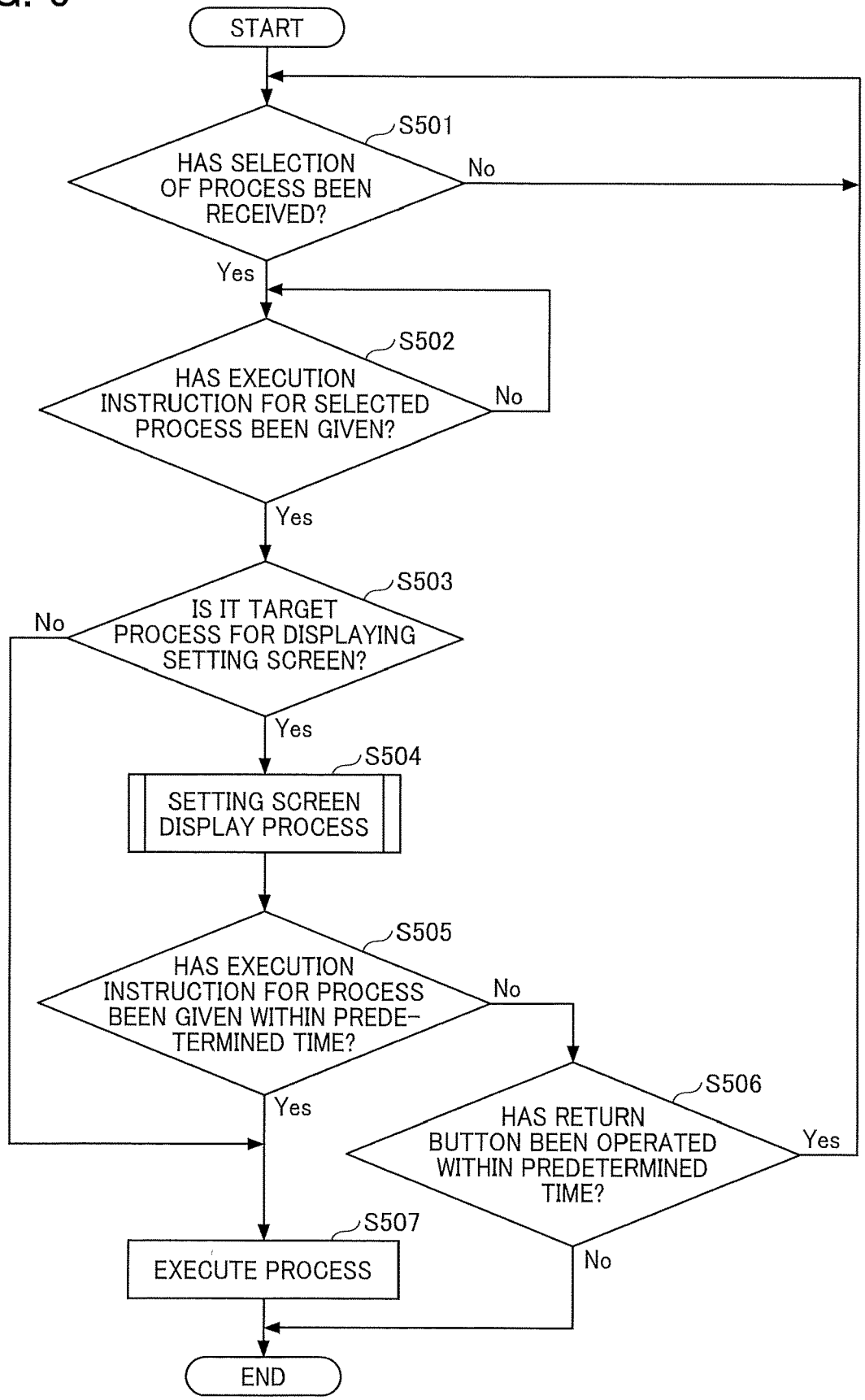
FIG. 5 is a flowchart illustrating an operation performed by the operation device, according to an embodiment of the present disclosure.

Hereinafter, operation of the operation device 200 of the present embodiment will be described with reference to FIG. 5. FIG. 5 is a flowchart for explaining operation of the operation device.

The operation device 200 according to the present embodiment determines whether or not the input receiver 241 of the display control processor 240 has received an operation for selecting a process to be executed on the control panel 205 (step S501). Note that the details of display on the control panel 205 according to the present embodiment will be described later. In a case where the input receiver 241 has not received the operation in step S501, the input receiver 241 stands by until the input receiver 241 receives the operation.

In a case where the input receiver 241 has received the operation in step S501, the display control processor 240 determines whether or not the input receiver 241 has received the operation of an execution instruction for the selected process (step S502).

In a case where the input receiver 241 has not received the execution instruction in step S502, the input receiver 241 stands by until the input receiver 241 receives the operation. Note that in the present embodiment, in a case where the input receiver 241 has not received the execution instruction within predetermined time, the display control processor 240 may switch display of the control panel 205 from the screen for selecting a process displayed in step S501 to a home screen.

In a case where the input receiver 241 has received the execution instruction in step S502, the display control processor 240 causes the target process determining unit 242 to refer to the target process storage unit 260 and to determine whether or not the process for which the execution instruction has been received is a target process for displaying the setting screen (step S503).

In a case where the process for which the execution instruction has been received is not a target process for displaying the setting screen in step S503, the operation device 200 proceeds to step S507 described later.

If the process for which the execution instruction has been received is a target process for displaying the setting screen in step S503, the display control processor 240 causes the display controller 243 to perform a setting screen display process for setting the orientation of a document to be set (step S504). Note that the setting screen display process will be described later.

Details of the setting screen display process in step S504 will be described. In step S504, the process is performed according to the flowchart of FIG. 9. The process of the flowchart of FIG. 9 is a process in a case where the ADF 350 includes the sheet sensor 309 and the document placement table 351 does not include the sheet sensor 309.

The display controller 243 determines whether or not the sheet sensor 309 that the ADF 350 includes detects paper (step S901). In a case where the sheet sensor 309 detects paper in step S901, the display controller 243 displays a setting screen (setting screen 70 described later) for selecting the orientation of the document placed on the ADF 350 (step S902). In a case where the sheet sensor 309 does not detect paper in step S901, the display controller 243 displays a setting screen (setting screen 72 described later) for selecting the orientation of the document placed on the document placement table 351 (step S903).

Step S901 of the image processing apparatus 100 according to the present embodiment is an example of a document detecting step, and steps S902 and S903 are examples of a screen displaying step.

Note that even though in FIG. 9, the ADF 350 includes the sheet sensor 309 and the document placement table 351 does not include the sheet sensor 309, the document placement table 351 may include the sheet sensor 309 and the ADF 350 may not include the sheet sensor 309. In this case, in a case where the sheet sensor 309 detects paper, the display controller 243 displays the setting screen (setting screen 72 described later) for selecting the orientation of the document placed on the document placement table 351. In a case where the sheet sensor 309 does not detect paper, the display controller 243 displays the setting screen (setting screen 70 described later) for selecting the orientation of the document placed on the ADF 350.

Both the ADF 350 and the document placement table 351 may include the sheet sensor 309. In that case, the display controller 243 may display the setting screen of one of the ADF 350 and the document placement table 351 which has detected paper. In a case where the sheet sensors 309 of both the ADF 350 and the document placement table 351 detect paper, the display controller 243 may display a screen notifying a user of presence of paper on both the ADF 350 and the document placement table 351.

In a case where the sheet sensors 309 of both the ADF 350 and the document placement table 351 detect paper, the display controller 243 may display the setting screen (setting screen 72 described later) for selecting the orientation of the document placed on the document placement table 351. In a case where the sheet sensors 309 of both the ADF 350 and the document placement table 351 detect paper, the display controller 243 may display the setting screen (setting screen 70 described later) for selecting the orientation of the document placed on the ADF 350.

Subsequently, the display control processor 240 determines whether or not the input receiver 241 gives an execution instruction for the process on the setting screen within predetermined time (step S505).

In a case where input receiver 241 does not give the execution instruction within the predetermined time in step S505, the display control processor 240 determines whether or not the input receiver 241 has performed the operation of returning to the previous screen on the setting screen within predetermined time (step S506).

In a case where the input receiver 241 has not performed the operation of returning within the predetermined time in step S506, the display control processor 240 terminates the processes. Note that in this case, the process selected in step S501 is not executed. The display control processor 240 may switch display of the control panel 205 from the setting screen to the screen for selecting the process displayed in step S501 or to the home screen.

In a case where the input receiver 241 performs the operation of returning within the predetermined time in step S506, the display control processor 240 returns to step S501.

In a case where the input receiver 241 has given the execution instruction for the process in step S505, the display control processor 240 requests the main device coordination unit 250 to transmit the execution instruction to the main device 300. When the main device coordination unit 250 receives the request, the main device coordination unit 250 transmits an execution request for the process to the main device 300, and terminates the process (step S507).

Hereinafter, with reference to FIGS. 6A to 7B, transition of the screen in the operation device 200 according to the present embodiment will be described.

Figure 6A:
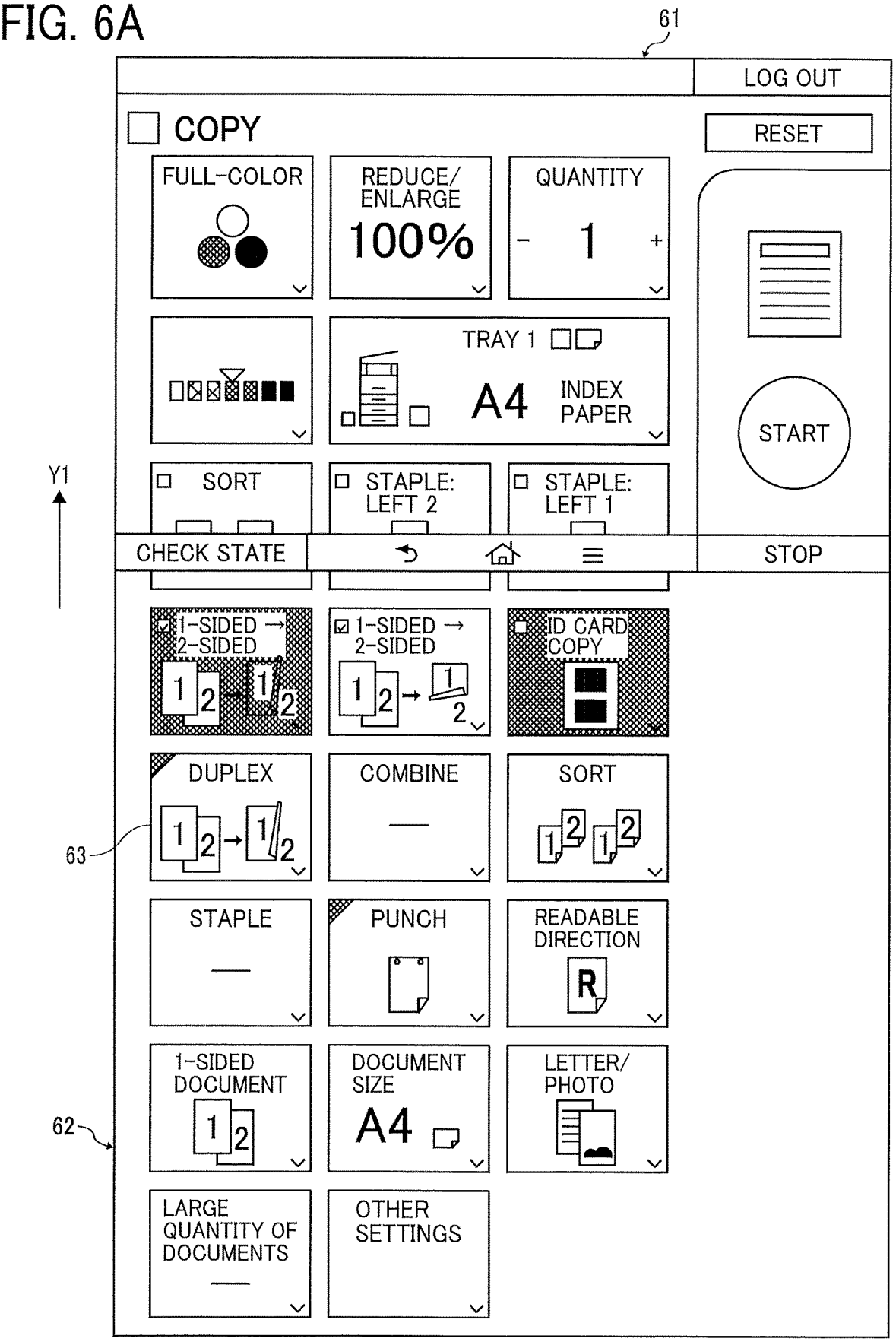
FIGS. 6A to 6D are views illustrating examples of screen transition on a control panel of the operation device, according to an embodiment of the present disclosure.
Figure 6B:
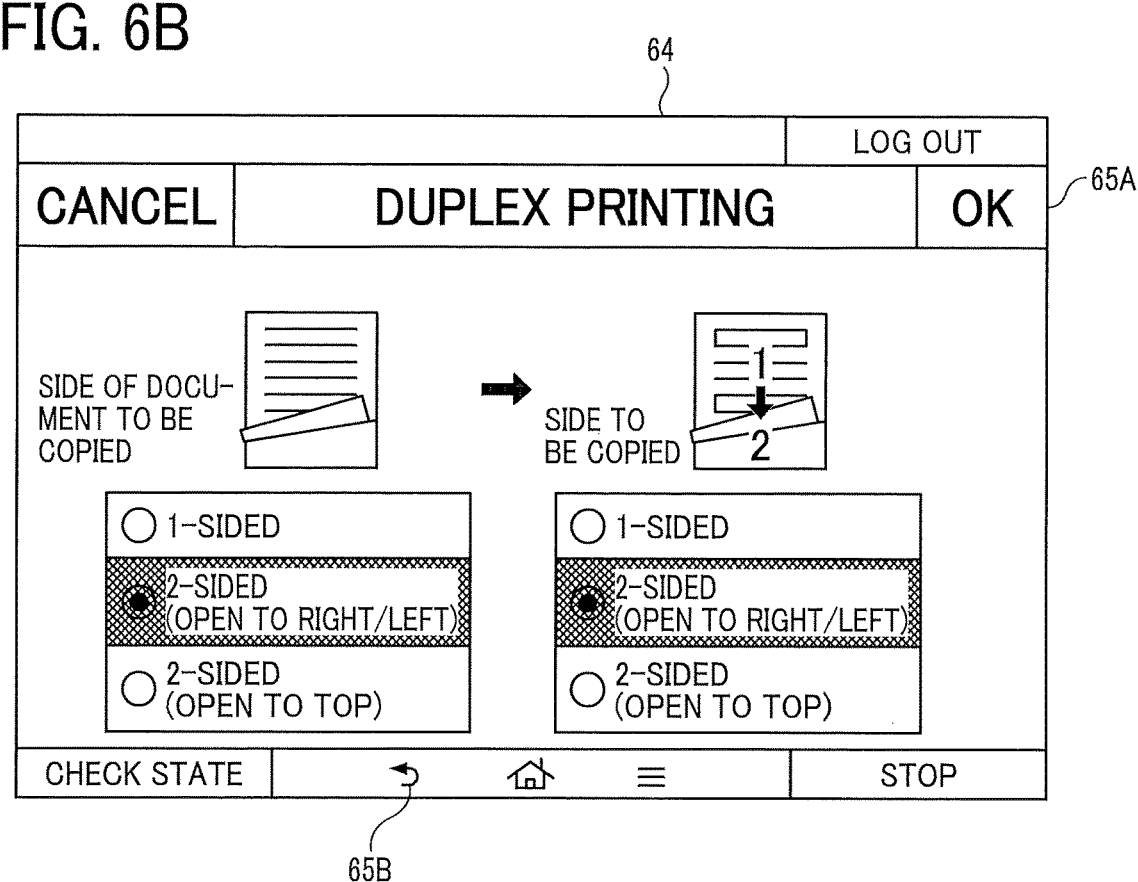
Figure 6C:
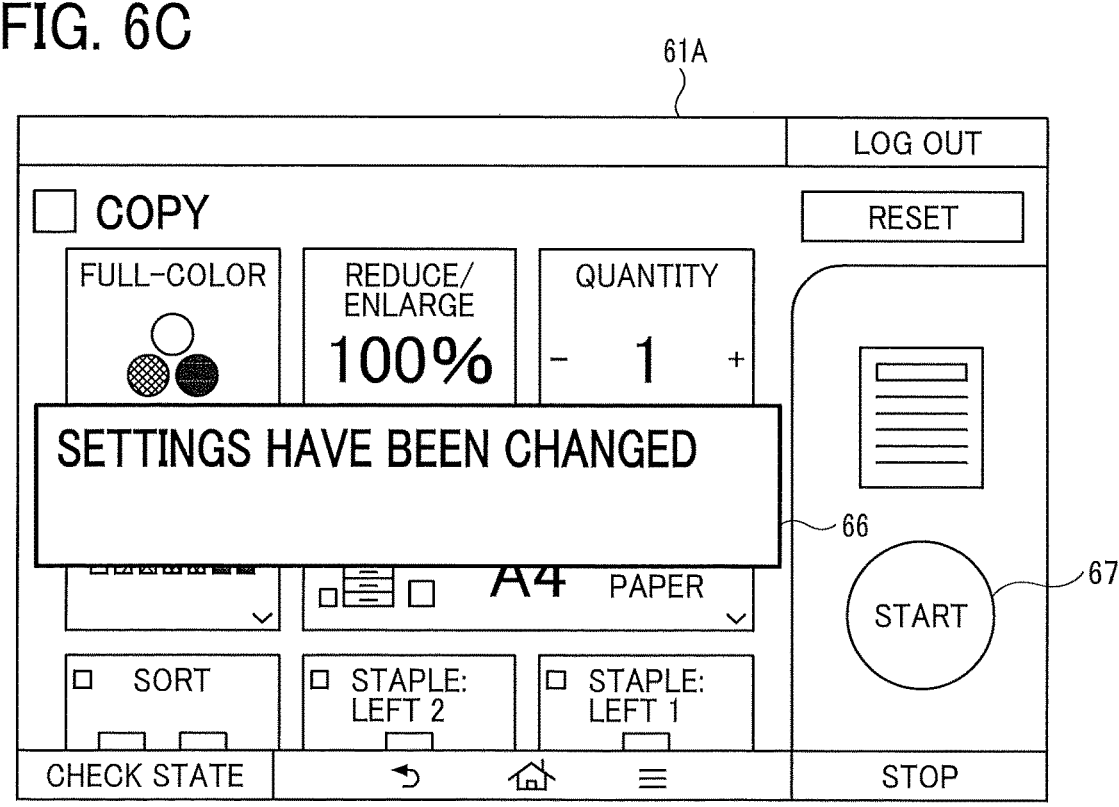
Figure 6D:
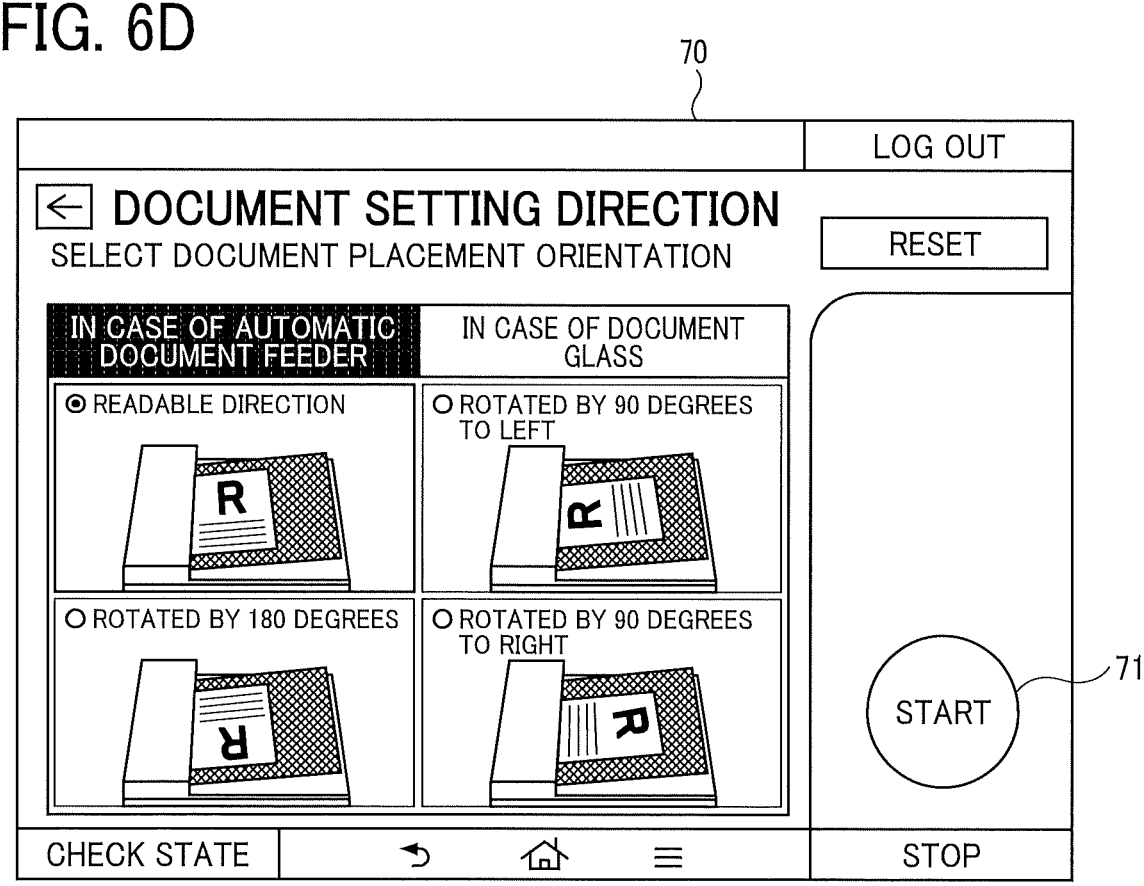

FIGS. 6A to 6D are views illustrating an example of screen transition on the control panel of the operation device. FIG. 6A illustrates an example of a top screen of the copy process displayed on the control panel 205. FIG. 6B illustrates an example of a setting screen of the duplex printing process. FIG. 6C illustrates an example of the top screen after setting of the duplex printing process. FIG. 6D illustrates an example of the setting screen.

For example, the top screen 61 of FIG. 6A is an example of the screen displayed on the control panel 205 in step S501 of FIG. 5. On the top screen 61 of FIG. 6A, scrolling an image 62 for displaying the top screen 61 in an arrow Y direction causes a display element 63 for selecting the duplex printing process to be displayed on the control panel 205.

When an operation on the display element 63 is received on the top screen 61, display on the control panel 205 transitions from the top screen 61 to a setting screen 64 for the duplex printing process illustrated in FIG. 6B. Note that reception of operation in the present embodiment means, for example, that the display element 63 is touched.

On the setting screen 64, settings relating to the duplex printing process are performed. When an OK button 65A indicating that the settings are completed is operated, the display on the control panel 205 transitions from the setting screen 64 to a top screen 61A illustrated in FIG. 6C.

Note that in a case where a return button 65B for returning to the top screen 61 is operated, display of the control panel 205 transitions from the setting screen 64 to the top screen 61 illustrated in FIG. 6A.

On the top screen 61A illustrated in FIG. 6C, a message 66 indicating that the settings for the duplex printing process have been made is displayed. Note that information of the message displayed on the top screen 61A may be stored, for example, in a storage device such as the ROM 202, the RAM 203, or the flash memory 204 of the operation device 200 in association with various processes.

When a start button 67 is operated on the top screen 61A, the display control processor 240 determines that the execution instruction for the duplex printing process has been given. Here, it is assumed that the sheet sensor 309 detects paper provided in the ADF 350. The display control processor 240 causes the control panel 205 to display the setting screen 70 for the orientation of a document illustrated in FIG. 6D The setting screen 70 illustrated in FIG. 6D is an example of the screen displayed in step S504 in FIG. 5. FIG. 6D illustrates the setting screen 70 in a case where the document is placed on the ADF 350. In the present embodiment, the setting screen 70 may be superimposed on the top screen 61A and displayed (for example, pop-up display), or display of the control panel 205 may transition from the top screen 61A to the setting screen 70.

When a start button 71 is operated on the setting screen 70, the display control processor 240 determines that the orientation of the document has been checked and the execution instruction for the duplex printing process has been given.

Figure 7B:
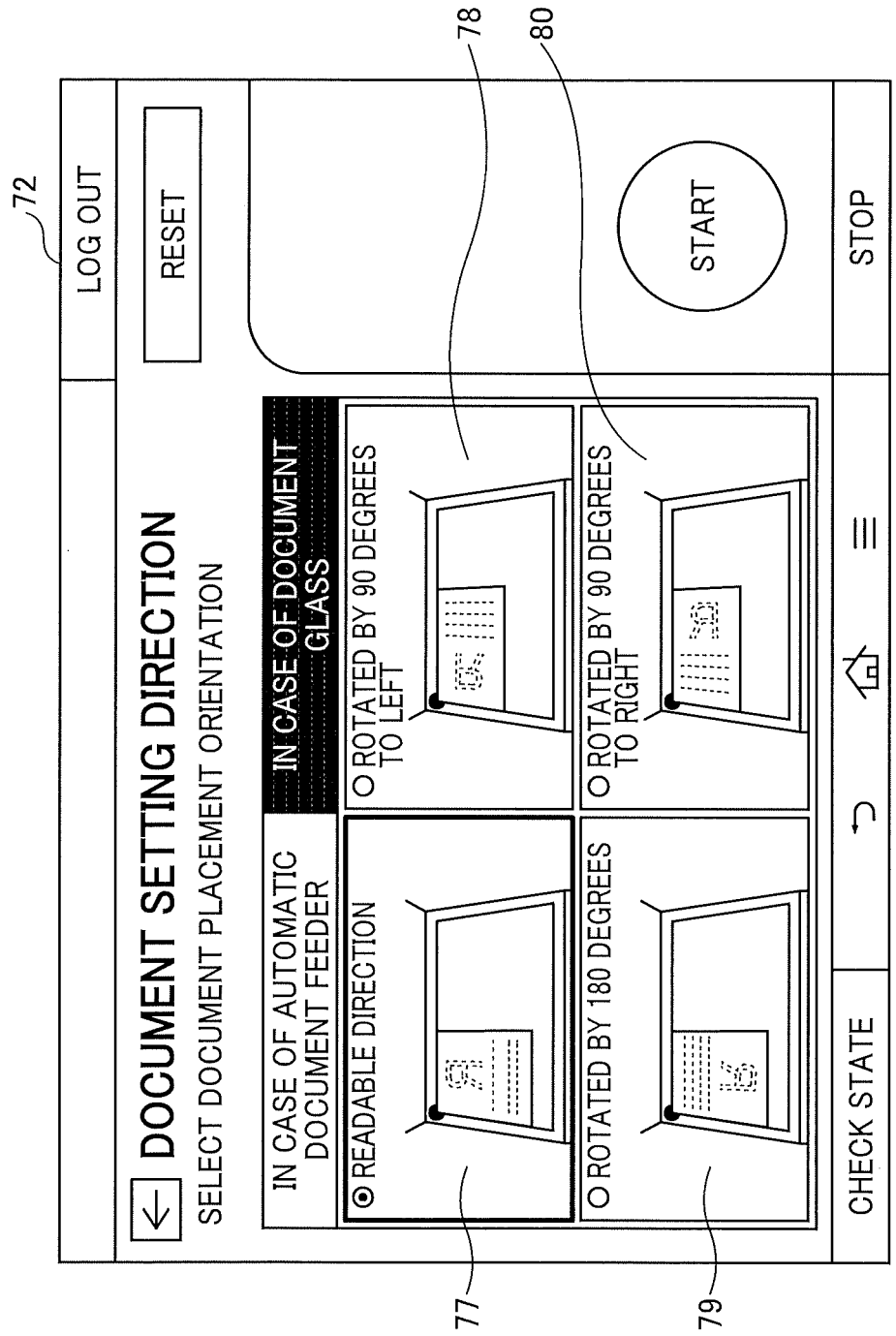

Here, the setting screens 70 and 72 of the present embodiment will be further described referring to FIGS. 7A and 7B. FIGS. 7A and 7B are views illustrating examples of the setting screen. FIG. 7A is a view illustrating the setting screen 70 displayed on the control panel 205 in a case where the sheet sensor 309 provided in the ADF 350 detects paper. The setting screen 70 is a screen assuming that a document is placed on the ADF 350. FIG. 7B is a view illustrating the setting screen 72 displayed on the control panel 205 in a case where the sheet sensor 309 provided in the ADF 350 does not detect paper. The setting screen 72 is a screen assuming that a document is placed on the document placement table 351.

The setting screen 70 according to the present embodiment is an example of a first screen for selecting the orientation of a document placed on the automatic document feeder. The setting screen 72 according to the present embodiment is an example of a second screen for selecting the orientation of a document placed on the document placement table.

On the setting screen 70 assuming that the document of FIG. 7A is placed on the ADF 350, characters written on the document on the screen are not reversed. The reason why the characters are not reversed is that in a case where the document is placed on the ADF 350, the side of the document facing the ceiling is read.

On the setting screen 72 assuming that the document of FIG. 7B is placed on the document placement table 351, characters written on the document on the screen are reversed horizontally. The reason why the characters are reversed horizontally is that in a case where the document is placed on the document placement table 351, the side facing the ground is read. Note that "characters are reversed horizontally" means that the characters are reversed horizontally as viewed from the direction in which the characters are read.

The setting screens 70 and 72 will be described in more detail.

The setting screen 70 includes images 73, 74, 75, and 76 in each of which the document is placed on the ADF 350. The images 73, 74, 75, and 76 in FIG. 7A are images of the documents placed in different orientations on the ADF 350. As described above, the setting screen 70 includes a plurality of images of the documents placed in different orientations on the ADF 350. Note that the images 73, 74, 75, and 76 are examples of the first image.

The image 73 indicates that the orientation in which the document is placed is the "readable direction". Note that the "readable direction" is the normal direction in which the orientation of the document is the normal direction of reading the document as viewed from a user, as illustrated in FIG. 7A. The image 74 indicates that the orientation in which the document is placed is a direction "rotated by 90 degrees to the left" from the "readable direction". The image 75 indicates that the orientation in which the document is placed is a direction "rotated by 180 degrees" from the "readable direction". The image 76 indicates that the orientation in which the document is arranged is a direction "rotated by 90 degrees to the right" from the "readable direction".

Note that in a case where a document is set in the ADF 350, the document is set so that the side on which characters are printed faces the ceiling. Therefore, a user in front of the image processing apparatus 100 can read the characters printed on the document in a state where the document is set.

The setting screen 72 includes images 77, 78, 79, and 80 in each of which a document is placed on the document placement table 351. The images 77, 78, 79, and 80 in FIG. 7B are images of the documents placed in different orientations on the document placement table 351. As described above, the setting screen 72 includes a plurality of images of the documents placed in different orientations on the document placement table 351. Note that the images 77, 78, 79, and 80 are examples of the second image.

The image 77 indicates that the orientation in which the document is placed is the "readable direction". The image 78 indicates that the orientation in which the document is placed is a direction "rotated by 90 degrees to the left" from the "readable direction". The image 79 indicates that the orientation in which the document is placed is a direction "rotated by 180 degrees" from the "readable direction". The image 80 indicates that the orientation in which the document is placed is a direction "rotated by 90 degrees to the right" from the "readable direction".

Note that in a case where a document is set in the document placement table 351, the document is set so that the side on which characters are printed faces downward. Therefore, a user in front of the image processing apparatus 100 cannot read the characters printed on the document in a state where the document is set.

As illustrated in FIGS. 7A and 7B, on the setting screens 70 and 72, the images 73 to 76 and the images 77 to 80 are displayed in identical arrangement on the screen of the control panel 205. In addition, images in which documents are placed in an identical orientation on the setting screens 70 and 72, for example, the image 73 and the image 77 are displayed at an identical position on the control panel 205.

In the example of FIG. 7A, the image 73 is highlighted and indicates that the orientation of the document corresponding to the selected process is the orientation that the image 73 indicates (state that the image 73 indicates). That is, according to the setting screen 70 of FIG. 7A, in the selected process, if the document is placed in the readable direction with the side of the document to be read upward, output intended by the user who has selected the process can be obtained.

In the example of FIG. 7B, the image 77 is highlighted and indicates that the orientation of the document corresponding to the selected process is the orientation that the image 77 indicates (condition that the image 77 indicates). That is, according to the setting screen 72 of FIG. 7B, in the selected process, if the document is placed in the readable direction with the side of the document to be read downward, output intended by the user who has selected the process can be obtained.

In the present embodiment, either the setting screen 70 or the setting screen 72 is displayed on the control panel 205 according to the detection result of the sheet sensor 309. As a result, the number of images displayed on the screen can be reduced. In addition, reducing the number of images enables a user to more easily select an image.

The setting screens 70 and 72 of the present embodiment indicate the document direction corresponding to the currently selected process. Therefore, a user can visually check whether or not the document is set in the orientation corresponding to the process. In addition, the user can visually check whether or not the side of the document is set so as to correspond to the process, for example, whether the side to be read of the document is directed to the ceiling or to the ground.

Note that a predetermined button on the screen may be pressed to switch between the setting screen 70 for selecting the orientation of the document placed on the ADF 350 and the setting screen 72 for selecting the orientation of the document placed on the document placement table 351. In that case, the orientation of the document selected on one of the screens before switching the screen may be selected on the other of the screens after switching the screen, that is, selection is maintained before and after screen switching. For example, in a case where the image 73 of the "readable direction" is selected on the setting screen 70, the image 77 in the "readable direction" may be selected when the screen is switched to the setting screen 72.

As described above, according to the detection result of the sheet sensor 309, either the first screen for selecting the orientation of the document placed on the ADF 350, or the second screen for selecting the orientation of the document placed on the document placement table 351 is displayed. Therefore, a user can easily set the direction of a document.

Second Embodiment

Figure 8:
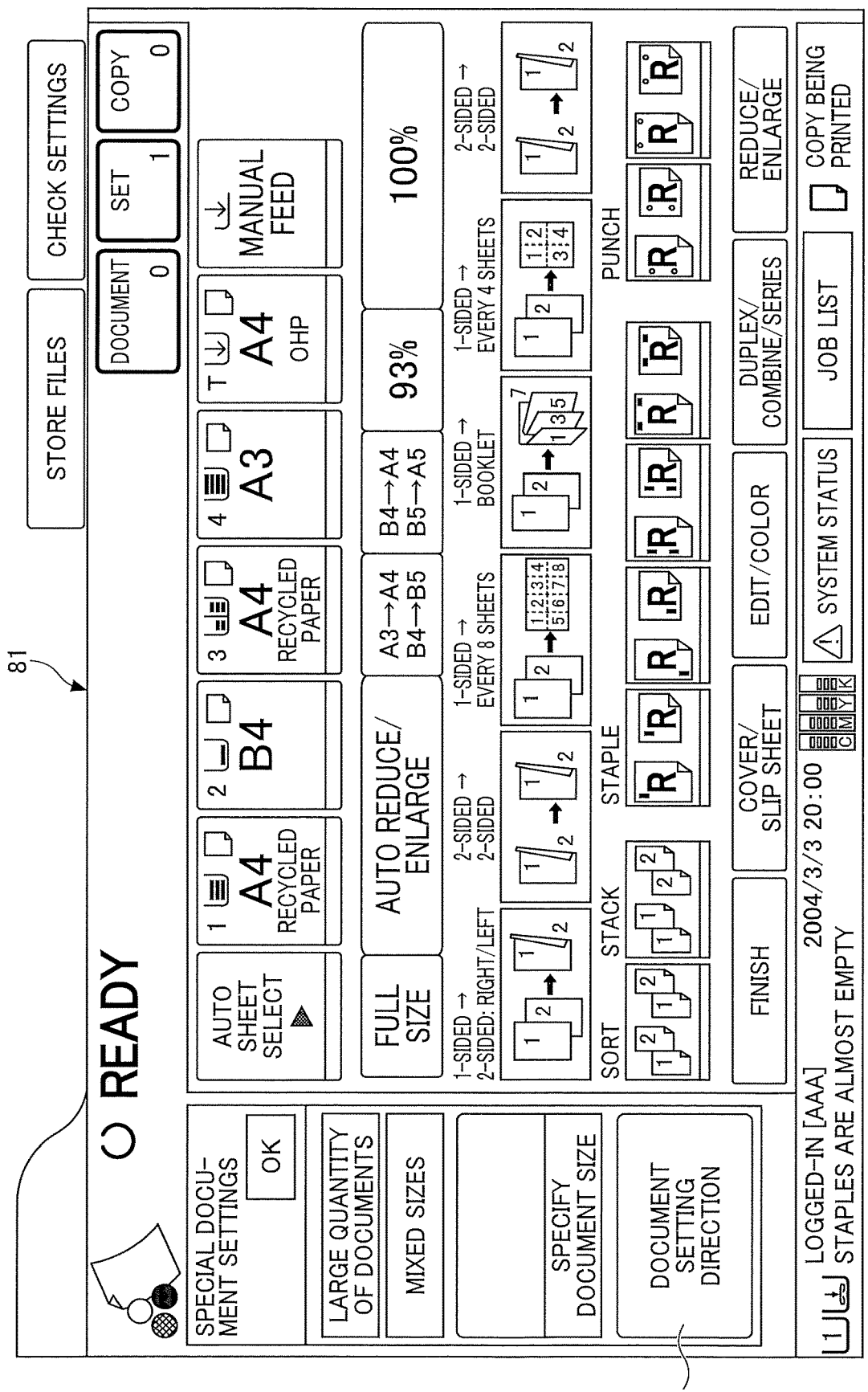
FIG. 8 is a view for explaining the effect of an embodiment of the present disclosure.

A second embodiment will be described below with reference to FIG. 8. FIG. 8 is a view for explaining the second embodiment. On a top screen 81 illustrated in FIG. 8, a display element 82 for setting the orientation of a document is displayed.

In an image processing apparatus 100, in a case where the display element 82 is selected to set the orientation of the document on the top screen 81, the setting screen 70 in FIG. 7A or the setting screen 72 in FIG. 7B is displayed according to the detection state of a sheet sensor 309. If the sheet sensor 309 outputs a detection signal when the display element 82 is selected, the setting screen 70 in FIG. 7A is displayed. If the sheet sensor 309 does not output a detection signal when the display element 82 is selected, the setting screen 72 in FIG. 7B is displayed.

Note that in the second embodiment, shift is made from the display element 82 to the setting screen 70 in FIG. 7A or the setting screen 72 in FIG. 7B. However, for example, after S503, S504, S505 and S506 in FIG. 5 in the first embodiment are performed to determine whether or not the process is a target for displaying the setting screen, the setting screen 70 or 72 may be displayed.

According to one or more embodiments of the present disclosure, a user can easily set the orientation of a document.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus comprising:
   an automatic document feeder;
   a document placement table;
   a document detector provided on at least one of the automatic document feeder and the document placement table, the document detector being configured to detect a document; and
   circuitry to cause a display to display one of a first screen that receives, from a user, an input for selecting an orientation of a document placed on the automatic document feeder and a second screen that receives, from the user, an input for selecting the orientation of the document placed on the document placement table, based on a detection result of the document detector,
   wherein the first screen includes a plurality of first images representing documents placed in different orientations on the automatic document feeder,
   the second screen includes a plurality of second images representing documents placed in different orientations on the document placement table,
   the image processing apparatus causes one of the plurality of first images or one of the plurality of second images to be selected,
   sides of the document to be read are opposite between the automatic document feeder and the document placement table with respect to a direction of gravity,
   each of the plurality of first images and the plurality of second images includes an image of a character, and
   the character of each of the second images is reversed horizontally.

2. The image processing apparatus according to claim 1, wherein the plurality of first images and the plurality of second images are displayed in an identical arrangement on a screen of the display, and
   the first image and the second image representing images of documents positioned in an identical orientation are displayed at identical positions on the display.

3. The image processing apparatus according to claim 1, wherein the first screen and the second screen can be switched to each other, and
   an orientation of the document selected on one of the first screen and the second screen before switching the screen is selected on another of the first screen and the second screen after switching the screen.

4. The image processing apparatus according to claim 1, wherein the circuitry further determines whether a process received from the user is displaying the first screen or the second screen.

5. A screen display method performed by an image processing apparatus including an automatic document feeder, a document placement table, a document detector provided on at least one of the automatic document feeder and the document placement table and configured to detect a document, and a display controller configured to cause a display to display an image, the screen display method comprising:
   detecting, by the document detector, a document on at least one of the automatic document feeder and the document placement table; and
   displaying on the display, by the display controller, one of a first screen that receives, from a user, an input for selecting an orientation of a document placed on the automatic document feeder and a second screen that receives, from the user, an input for selecting an orientation of the document placed on the document placement table, based on a detection result of the detecting,
wherein the first screen includes a plurality of first images representing documents placed in different orientations on the automatic document feeder,
the second screen includes a plurality of second images representing documents placed in different orientations on the document placement table,
the image processing apparatus causes one of the plurality of first images or one of the plurality of second images to be selected,
sides of the document to be read are opposite between the automatic document feeder and the document placement table with respect to a direction of gravity,
each of the plurality of first images and the plurality of second images includes an image of a character, and
the character of each of the second images is reversed horizontally.

\* \* \* \* \*